9678X
J. M. Peck.
Balance Scales.
Patented May 23, 1836.
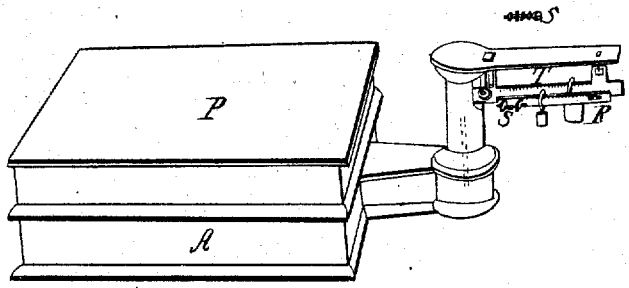
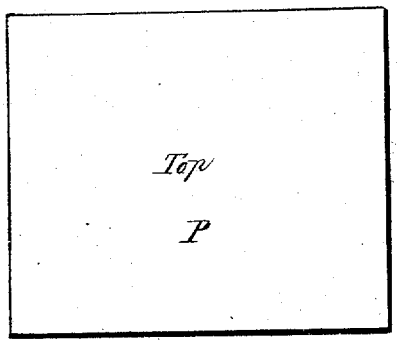
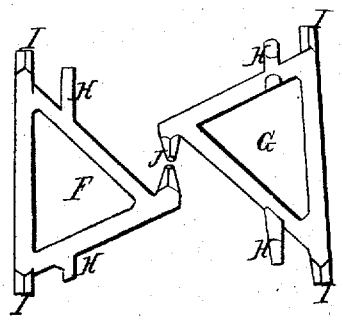
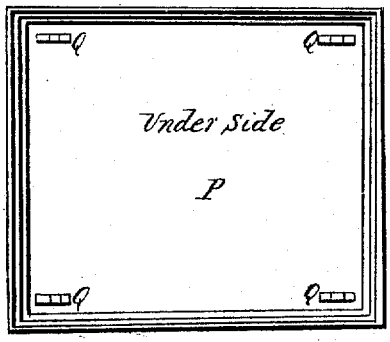
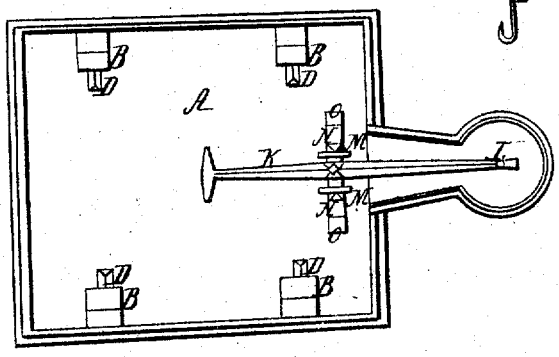
THE NORRIS PETERS CO., WASHINGTON, D. C.

James M. Peck of Lyndon, State of Vermont
Letters Patent,

The schedule referred to in these Letters Patent & making part of the same, containing a description in the words of the said James M. Peck himself of his improvement in the Platform Balance Be it known that I, James M. Peck of the Town of Lyndon in the County of Caledonia, & State of Vermont have made a new and useful improvement in the Platform Balance, which is described as follows, reference being had to the annexed drawing of the same making part of this specification. — This Balance consists of a rectangular box or case A, in which are erected four standards B. having arms at the top D, projecting at right angles, which arms are brought to a sharp edge on the top over which are suspended rings C. and in these rings, four in number are suspended the triangular compound levers, F, G. by arms H. projecting from them, formed into knife edges, similar to those just mentioned producing the points d'appui or fulcra of the balance — the bearing points I. of the platform being outside of the points d'appui just mentioned, These levers are of a triangular shape and have two other arms J. with knife edges, resting in the centre of the case & coupled by rings to the end of a third lever, K, placed below, This third lever is straight, and extends thro' the case, to a perpendicular rod L. connecting it with the short end of the Steelyard, — having its fulcrum inside of the case near one end formed by two arms M, projecting from the sides of the lever with knife edges suspended in rings connected with arms, N. also having knife edges, projecting from standard O, fixed in the bottom of the case — the fulcrum being of the second order. The end of the lever
outside of the rectangular case is connected with the lower
end of the perpendicular rod, by an arm or crap piece with
a knife edge suspended in an eye formed at the end of the
rod. the upper end of the rod is attached to the short end
of the lever or Steelyard. The platform P. rests upon the four
knife edges J. of the triangular levers before described on
four studs or supports Q. projecting from the under side
of the platform, faced with steel, having cavities in them
to receive the knife edges of the levers. This platform instead
of moving inside the case projects over it and moves on the
outside thereof, having a perpendicular ledge or edging all
round projecting downward; on the side of the long end of
the steelyard or lever and parallel with it is a moveable
beam R. or Nonius graduated for determining the ounces.

It is regulated by a spiral spring and screw S. for
producing equilibrium in the platform — The steelyard T.
is graduated in the usual manner. A large poise is ap-
plied to the steelyard for determining the pounds. A small
poise is applied to the Nonius for determining the ounces Operation. The platform being first brought to equil-
ibrium by the poise and nonius with the screw and spring
the article to be weighed is placed upon the platform, then
move the poise along the steelyard till it is balanced wh
determining the weight in pounds, the ounces being determin
by the small poise moving along the nonius

What I claim as my invention and desire to secur
by Letters Patent, consists in the method of constructing t
platform so as to make it operate altogether on the ou
side of the case instead of the inside; in the peculiar
arrangement of the levers, so as to bring the bearing points
of the platform at the outside of the fulcra of the
triangular levers; and in the method of constructing th sidering monies as before specified and described

Witness

Wm P. Elliot
Lucius Kimball

James M. Peck

Exp
HJC 715 wd

Drawing